May 20, 1952     J. L. EDELEN     2,597,231
CARBURETOR FLOW TESTING APPARATUS

Filed April 19, 1950     3 Sheets-Sheet 1

INVENTOR.
JAMES L. EDELEN
BY
ATTORNEY

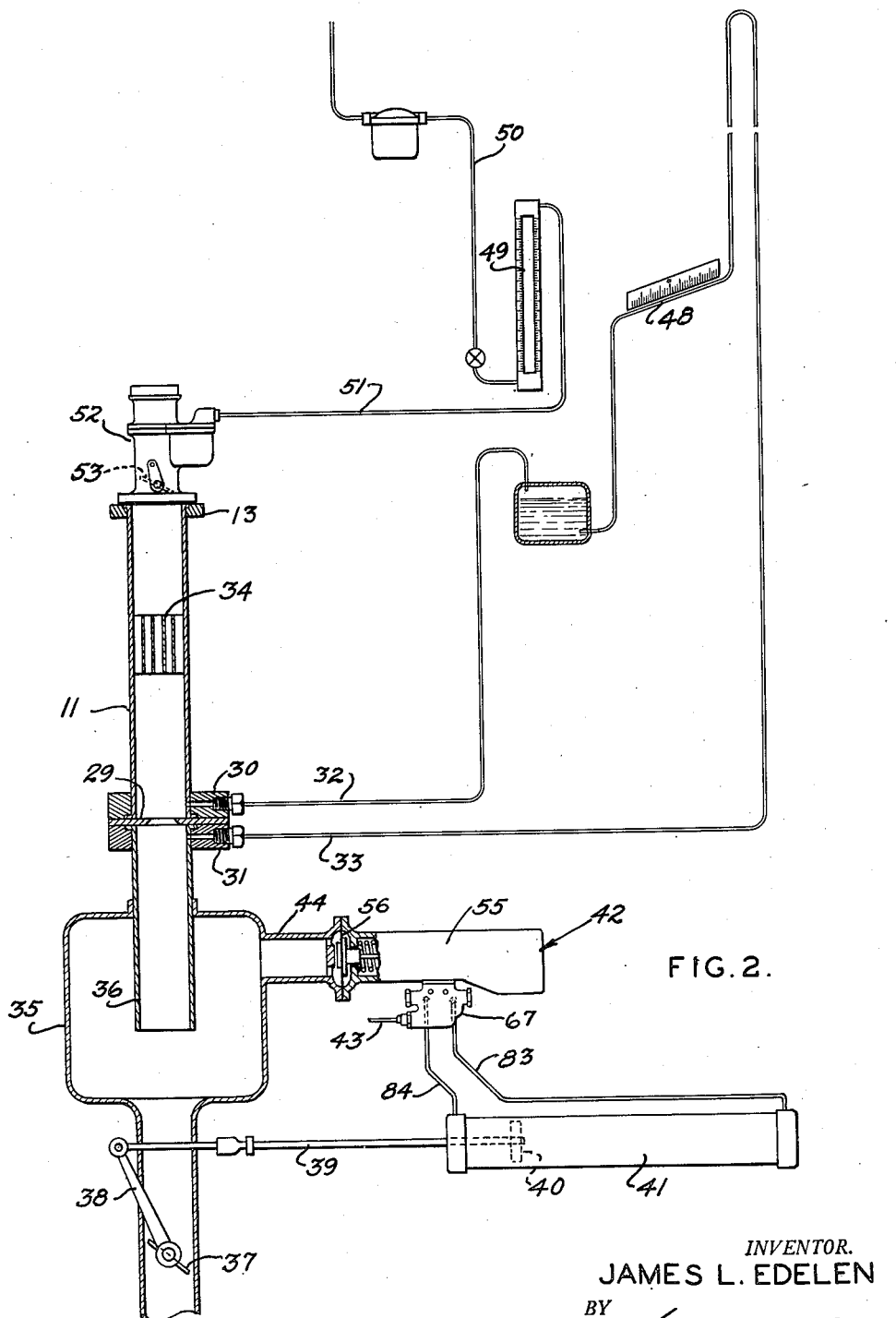
FIG. 2.
INVENTOR.
JAMES L. EDELEN
BY
ATTORNEY

May 20, 1952   J. L. EDELEN   2,597,231
CARBURETOR FLOW TESTING APPARATUS
Filed April 19, 1950   3 Sheets-Sheet 3

INVENTOR.
JAMES L. EDELEN
BY
ATTORNEY

Patented May 20, 1952

2,597,231

UNITED STATES PATENT OFFICE 2,597,231

CARBURETOR FLOW TESTING APPARATUS

James L. Edelen, Kirkwood, Mo., assignor to Carter Carburetor Corporation, St. Louis, Mo., a corporation of Delaware Application April 19, 1950, Serial No. 156,912

5 Claims. (Cl. 73—118)

This invention relates to flow meters for accurately measuring the quantities of fuel and/or air which will pass through a carburetor under definite pressure and throttle conditions and, thereby, comparing the carburetor being tested with a standard or "OK" sample carburetor.

Carburetors have been flow tested in production quantities by providing a series of stands to which a number of carburetors may be attached, simultaneously, for testing by the crew of operators on duty. A flow meter, connected in the fuel supply to each test stand, determines the rate of fuel delivery (consumption) corresponding to the rate of mixture delivery, as measured by the differential pressure which exists on opposite sides of a restriction in the induction conduit connected to the stand. In a large flow test room, all or a considerable number of the stands may be connected to a single suction pump through a suitable header in which there may be provided a pressure responsive device tending to maintain uniform pressure within the header. However, a time element is required for readjustment of the header pressure each time the demand in the test stands changes due to application or removal of test carburetors. Since the flow test operators work rapidly, it frequently occurs that readings are taken before there has been time for the header pressure to again reach normal. These improper readings may result in the passing or scrapping of the test carburetor which may not be justified.

The main object of the present invention is to provide flow test apparatus in which the suction condition at each test stand will remain constant at all times, irrespective of whether or not an adjacent test stand may be in operation, and without unduly multiplying the number of complete test mechanisms, including suction pumps. The invention consists in providing in the branch conduit for each test stand, an individual pressure maintaining instrumentality which cooperates with the constant pressure device provided in the header to attain this object.

In the accompanying drawings which illustrate the invention,

Fig. 2 shows in greater detail some of the parts which apply to a single test stand.

Figure 1:
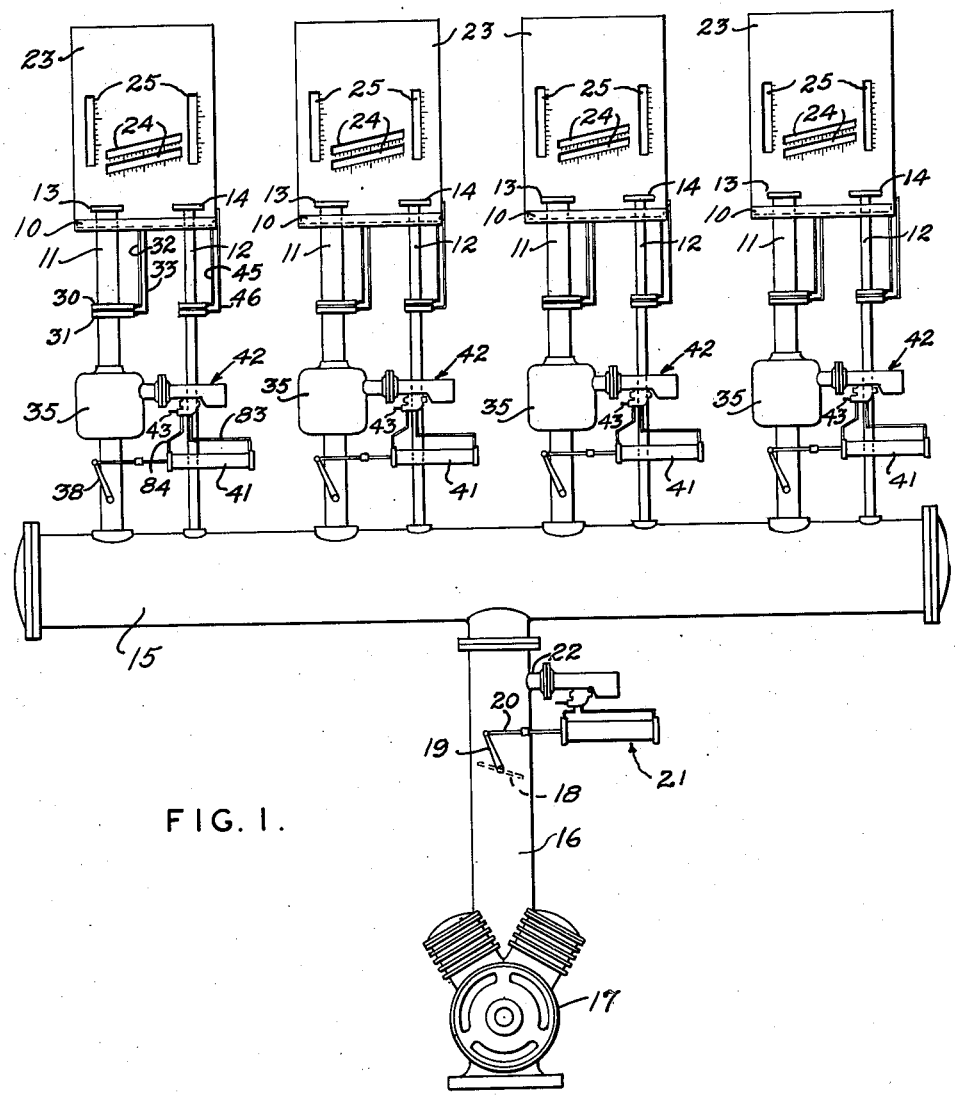
Fig. 1 is a view, largely diagrammatic, representing a flow measuring system including a plurality of test stands.

The apparatus in Fig. 1 includes a plurality of test stands, each represented by a shelf 10 through which opens a pair of branch suction conduits 11 and 12, the former being substantially larger than the latter. These conduits have bolting flanges 13 and 14 at their upper extremities for attachment of a carburetor to be tested, as by the means covered in an application, Serial No. 159,690, filed May 3, 1950, in the name of Adolph J. Rubin. Branch induction conduits 11 and 12 are arranged in pairs, as shown, and lead to a header 15 which is connected by a pipe 16 to main suction pump 17. Within pipe 16 there is provided a butterfly valve 18 connected by a lever 19 and link 20 to device 21 connected by passage 22 to the header. Device 21 functions in response to the pressure in header 15 to actuate valve 18 so as to tend to maintain this pressure substantially uniform. Each stand also includes a panel 23 having windows 24 and 25 for inspection of fuel flow and pressure registering meters associated, respectively, with induction pipes 11 and 12.

As best shown in Fig. 2, each branch passage 11 (or 12) is provided with an orifice forming restriction 29 on the opposite sides of which are fittings 30 and 31 for connecting tubes 32 and 33 to the branch conduit. Flow guiding vanes 34 are interposed between the restriction and the mounting flange. Each of the larger branch conduits 11 is provided with an enlarged chambered portion 35 into which the upper portion of conduit 11 extends, as at 36, so as to shield the upper portion of the chamber from the effects of the direct air flow through the conduit. A butterfly throttling valve 37 is provided in each conduit below or posterior to chamber 35 and connected by a lever 38 and link 39 to the piston 40 of a differential pressure motor 41. This motor is controlled by a pressure sensitive control device 42, best shown in Figs. 3 and 4, to which compressed air is supplied through a tube 43 for operating motor 41, and which communicates by means of a passage 44 with the shielded portion of chamber 35. Suction motor 41 and pressure control 42 may be identical with corresponding parts designated 21 in Fig. 1.

Each smaller branch conduit 12 includes a restriction forming orifice, corresponding to orifice 29 in Fig. 2, and connections on opposite sides thereof for tubes 45 and 46. However, auxiliary throttling valve 37 and its control mechanism, including motor 41, control 42, and chamber 35 are omitted from the smaller conduits. Tubes 32 and 33 and 45 and 46 lead to manometers, similar to manometer 48 and located behind windows 24, for measuring the differential pressure which exists at any given time on the opposite sides of the orifice 29 in the corresponding branch conduit. In connection with each test stand there are also provided a pair of liquid fuel flow meters, as 49, located behind windows 25 and connected by tubing 50 to a suitable source of liquid fuel maintained at substantially constant pressure and by tubing 51 to the carburetor 52 being tested. A flow meter is provided for each suction conduit 11 and 12.

In the testing procedure, a carburetor is first applied to one of the smaller branch conduits 12 with its throttle 53 in idling position and readings taken on the appropriate flow meter 49 and manometer 48. The carburetor is then shifted to one of the larger branch conduits 11 and tested in one or more open throttle positions. In each test, the operator is provided with standard readings of the manometer and fuel flow meter and with limit ranges which must be exhibited during the test. A carburetor is scraped or further inspected and repaired if, under a given differential pressure condition, at restriction 29, as read on the manometer 48, the fuel flow reading does not fall within a given range. However, this test procedure assumes a uniform pressure on the posterior side of restriction 29, that is, in the case of larger branch conduits 11, within chamber 35. Such uniformity is especially important in measuring the open throttle flows and Figs. 2, 3, and 4 show in detail the instrumentality utilized for insuring such pressure uniformity.

Figure 3:
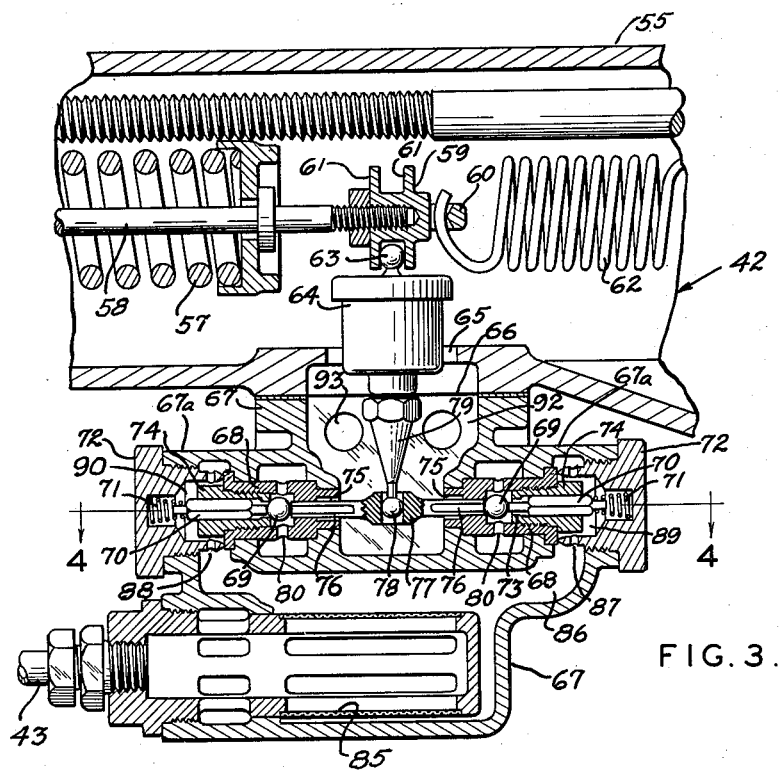
Fig. 3 is an enlarged detail section showing a part of the pressure controlling instrumentality applied to the individual test stand.
Figure 4:
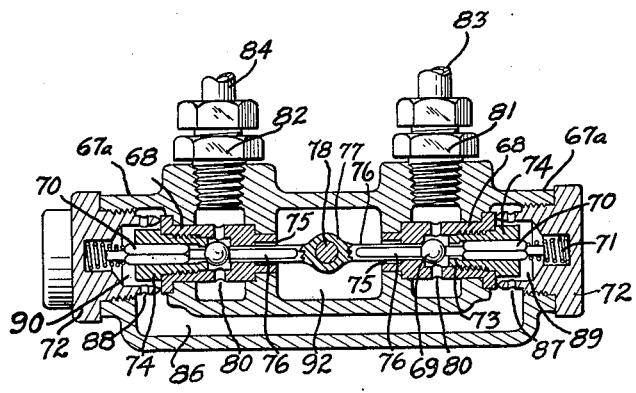
Fig. 4 is a detail section taken on line 4—4 of Fig. 3.

Control device 42 does not, in itself, constitute the present invention, but is shown somewhat in detail in Figs. 3 and 4 for better understanding. This control comprises an elongated housing 55 within which is a diaphragm 56 which is exposed on its left side to the shielded portion of chamber 35 through passage 44. The diaphragm is constantly urged to the right by a coiled spring 57 and is connected by a stem 58 to a tapped member 59 having an eye 60 and a pair of parallel annular ribs 61. A tension spring 62, connected into eye 60 applies a pressure to the diaphragm in the same sense as compression spring 57. A small, spherical projection 63 on a tilting member 64 is received between ribs 61 on member 59. Housing 55 has a bottom opening 65 accommodating tilting member 64 and sealed by a diaphragm 66.

A second, hollow casing structure 67 is secured about this opening and clamps the diaphragm in position. The second casing has aligned, laterally projecting hollow parts 67a each receiving a cup-like valve seat 68 and a ball valve 69 normally held on its seat by a pin 70 of angular section urged inwardly by a compression spring 71 seating against a removable housing cap 72. Each pin 70 is received in the central orifice 73 of a plug 74 screwed into the open end of the valve seat cup. The seat cup and plug form a cage for the ball valve with opposite seats at the ends of orifices 73 and 75, the latter being in the end of the cup member. The valve may be unseated by a lateral finger 76 projecting from an apertured element 77 which receives the spherical lower extremity 78 on depending portion 79 of tilting member 64.

The valve seat and ball valve elements on each side of depending casing portion 67 are identical. Each valve actuating pin 76 extends through central orifice 75 in the seat member and the seat member also has radial ports 80 which communicate with one of the tube fittings 81, 82. The fittings accommodate tubes 83 and 84 leading to the opposite ends of differential fluid pressure motor 41. Compressed air is led to the valve structure by tube 43 through removable screen 85, thence to chamber 86 which communicates through ports 87 and 88 with small chambers 89 and 90 at the ends of valve seat plugs 74 and within casing caps 72. The fluid pressure then flows around angular section pin 70 and in the orifice 73 which is open at the moment through ports 80, fitting 81 or 82, and tube 83 or 84 to one side of motor 41, causing actuation of the same and shifting of throttling valve 37. Ball valves 69 act alternately so that when they are in their leftwardmost positions, as in Figs. 3 and 4, fluid pressure may enter right hand tube 83. At the same time, the pressure in the opposite side of the fluid motor may exhaust through the other tube 84, through ports 80 in the corresponding seat member 68, thence through central orifice 75 in the seat member into central chamber 92 and to atmosphere through ports 93.

This mechanism provides an extremely sensitive and prompt adjustment of throttling valve 37 to compensate for any changing of pressure within chamber 35. The pressure on the under side of restriction 29, in larger conduit 11, being doubly safeguarded by pressure control means 18 and 21 in the header and the auxiliary pressure control instrumentality 37, 41, 42, etc., just described, in each branch suction conduit, will remain accurately constant at all times. Therefore, the readings obtained on corresponding manometer 48 and flow meter 49 will accurately indicate the conditions of fuel and air flow and reflect the condition of the carburetor being tested. Moreover, this accuracy will not be seriously affected by changes in the conditions to which the other flow stands are subjected, a condition which would be true to a much lesser degree and only when a time interval has passed after a change in any one of the flow stands, if the secondary pressure maintaining instrumentality shown in Figs. 2, 3, and 4 were omitted.

The invention, accordingly, insures accurate and very rapid testing of carburetors and for this reason, is readily adaptable to high production operation where it will considerably improve the quality of carburetors prepared for shipment by the factory. Of course, the number of flow stands attached to the header may be multiplied in accordance with the capacity of the suction pump and the test load.

Various features, such as the particular types of flow measuring instruments and the number of test stands applied to a single suction pump and header may be modified, and the exclusive use of all modifications as come within the scope of the appended claims is contemplated.

I claim:

1. Apparatus for flow testing carburetors comprising test mountings for a plurality of carburetors, a suction pump, air conduits connecting said mountings and said pump, meters for measuring fuel and air passing through carburetors on said mountings, a throttling valve in each of said conduits, and a pressure sensitive device communicating with each of said conduits between the valve therein and the test mounting therefor and connected to the corresponding valve for shifting the same responsive to pressure variations in said conduit to maintain substantially constant pressure in said conduit.

2. Apparatus for flow testing carburetors comprising a plurality of stands for mounting carburetors to be tested, a suction pump, a suction conduit leading from said pump including a header and branch conduits, each connected to one of said stands, a restriction in each of said branch conduits and a flow meter connected thereto on opposite sides of the restriction therein for measuring flow therethrough, a valve between said pump and said header and a device responsive to pressure in said header and connected to said valve so as to tend to maintain substantially uniform pressure in said header, and pressure adjusting means for the zone in each branch conduit immediately posterior to the restriction therein comprising a throttling valve posterior to said zone in the branch conduit, and an instrumentality responsive to pressure conditions in said zone and operatively connected to said throttling valve for actuating the same to maintain constant pressure in said zone whereby said flow meter accurately reflects pressure conditions of the flow delivered by the carburetor being tested.

3. Apparatus as described in claim 2 including branch conduits of relatively small and larger sizes for testing carburetors, respectively, for idling and open throttle operation.

4. Apparatus as described in claim 2 further including a source of liquid fuel supply and a fuel flow meter for each branch conduit.

5. Apparatus as described in claim 2 including branch conduits of relatively small and larger sizes for testing carburetors, respectively, for idling and open throttle operation, each larger branch conduit having baffling in the zone with which said pressure responsive instrumentality communicates to shield said zone from the direct flow therethrough.

JAMES L. EDELEN.

REFERENCES CITED

The following references are of record in the file of this patent:

UNITED STATES PATENTS

| Number | Name | Date |
| --- | --- | --- |
| 2,293,725 | Fiock et al. | Aug. 25, 1942 |
| 2,414,582 | Crosby et al. | Jan. 21, 1947 |
| 2,494,936 | Edelen | Jan. 17, 1950 |